US012679542B2

(12) United States Patent
Hong et al.

(10) Patent No.: US 12,679,542 B2
(45) Date of Patent: Jul. 14, 2026

(54) SEAT FOR MOBILITY VEHICLE

(71) Applicants: HYUNDAI MOTOR COMPANY, Seoul (KR); KIA CORPORATION, Seoul (KR); HYUNDAI TRANSYS INC., Seosan-si (KR)

(72) Inventors: Suk Won Hong, Bucheon-si (KR); Ga Be Nam, Hwaseong-si (KR); Jong Seok Han, Suwon-si (KR); Gil Ju Kim, Hwaseong-si (KR); Sang Do Park, Seoul (KR); Sang Man Seo, Hwaseong-si (KR); Hyun Ji Lee, Suwon-si (KR); Hyung Rae Kim, Suwon-si (KR); Jeong Yong Yoo, Hwaseong-si (KR); Gyung Do Park, Hwaseong-si (KR); Dong Hwan Kim, Hwaseong-si (KR)

(73) Assignees: HYUNDAI MOTOR COMPANY, Seoul (KR); KIA CORPORATION, Seoul (KR); HYUNDAI TRANSYS INC., Seosan-si (KR)

( * ) Notice: Subject to any disclaimer, the term of this patent is extended or adjusted under 35 U.S.C. 154(b) by 126 days.

(21) Appl. No.: 18/640,210

(22) Filed: Apr. 19, 2024

(65) Prior Publication Data

US 2025/0162716 A1     May 22, 2025

(30) Foreign Application Priority Data

Nov. 20, 2023     (KR) ......................... 10-2023-0160188

(51) Int. Cl.
*B64D 11/06*          (2006.01)

(52) U.S. Cl.
CPC .................................. *B64D 11/0619* (2014.12)

(58) Field of Classification Search
CPC ... B60N 2/427; B60N 2/42709; B60N 2/4242
See application file for complete search history.

(56) References Cited

U.S. PATENT DOCUMENTS 3,985,388 A * 10/1976 Hogan ............... B60N 2/42709
297/216.17
5,842,669 A * 12/1998 Ruff ....................... B64D 25/04
188/375

(Continued)

FOREIGN PATENT DOCUMENTS

CN      112298574 A     2/2021
CN      113264191 A     8/2021
(Continued)

*Primary Examiner* — Joshua J Michener
*Assistant Examiner* — Ryan Andrew Yankey
(74) *Attorney, Agent, or Firm* — Morgan, Lewis & Bockius LLP

(57) ABSTRACT

In a seat for a mobility vehicle configured for absorbing an impact load vertically applied in the event of an accident of an aerial mobility vehicle, ensuring the safety of a passenger, the seat includes a seat frame supporting at least a seat bottom of the seat; at least one leg portion supporting the seat frame and including an elongated hole formed to extend in a longitudinal direction of the at least one leg portion; and a pin member mounted on the seat frame and inserted into the elongated hole to connect the seat frame and the leg portion to each other. The elongated hole at least partially includes a narrow portion including a width narrower than a diameter or a width of the pin member.

17 Claims, 8 Drawing Sheets

(56) References Cited

U.S. PATENT DOCUMENTS

| | | | | |
|---|---|---|---|---|
| 8,226,163 | B1 * | 7/2012 | Pearson | B64D 11/0696 |
| | | | | 296/68.1 |
| 8,393,574 | B2 | 3/2013 | Kismarton | |
| 8,408,643 | B2 * | 4/2013 | Honnorat | B64D 11/0689 |
| | | | | 297/216.17 |
| 10,232,943 | B2 | 3/2019 | Ozaki et al. | |
| 10,612,616 | B1 * | 4/2020 | Lou | F16F 7/123 |
| 2010/0207433 | A1 * | 8/2010 | Hahn | B60N 2/24 |
| | | | | 297/216.1 |
| 2014/0339866 | A1 | 11/2014 | Olivares | |
| 2024/0294259 | A1 * | 9/2024 | Pozzi | B60N 2/42709 |
| 2025/0145296 | A1 * | 5/2025 | Hong | B64D 11/0696 |
| 2025/0289392 | A1 * | 9/2025 | Hong | B60R 22/26 |

FOREIGN PATENT DOCUMENTS

| | | | | | |
|---|---|---|---|---|---|
| EP | 0463436 | A2 * | 1/1992 | | B60N 2/42709 |
| FR | 3055611 | A1 * | 3/2018 | | B64D 11/0619 |
| JP | 4169731 | B2 | 8/2008 | | |
| JP | 6038877 | B2 | 12/2016 | | |
| JP | 6130327 | B2 | 4/2017 | | |
| KR | 10-2011-0083653 | A | 7/2011 | | |
| WO | 2010/041235 | A1 | 4/2010 | | |

* cited by examiner

SEAT FOR MOBILITY VEHICLE

CROSS-REFERENCE TO RELATED APPLICATION(S)

The present application claims priority to Korean Patent Application No. 10-2023-0160188 filed on Nov. 20, 2023, the entire contents of which is incorporated herein for all purposes by this reference.

BACKGROUND OF THE PRESENT DISCLOSURE

Field of the Present Disclosure

The present disclosure relates to a seat for a mobility vehicle capable of absorbing an impact load applied vertically in the event of an accident of an aerial mobility vehicle, for example, ensuring the safety of a passenger.

DESCRIPTION OF RELATED ART

For example, when an aircraft fails to land properly, a significant portion of impact load is absorbed by a shock absorber provided on a fuselage of the aircraft.

Nevertheless, when an impact load exceeds an impact absorption capacity of the shock absorber, such as in the event of a failed landing of the aircraft, excessive impact may be transmitted to passengers so that a seat of the aircraft may be required to be able to withstand an acceleration of 16 times the acceleration of gravity without separating from a floor of the fuselage or significantly deforming.

To address such a need, a technology has been provided to add a shock absorber to a seat of an aircraft, particularly to leg portions of the seat. However, the addition of a shock absorber may not only complicate the seat or the leg portions in terms of a configuration, but also increase a weight of the seat, resulting in an increase in operating cost of the aircraft and an increase in production cost of the seat.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a seat for a mobility vehicle configured for absorbing an impact load vertically applied in the event of an accident of an aerial mobility vehicle, for example, ensuring the safety of a passenger.

Another aspect of the present disclosure provides a seat for a mobility vehicle having a shock absorption means having a simple configuration, sufficiently absorbing an impact load without increasing the number of parts, weight, and costs.

According to an aspect of the present disclosure, there is provided a seat including a seat frame supporting at least a seat bottom of the seat; at least one leg portion supporting the seat frame and including an elongated hole formed to extend in a longitudinal direction of the at least one leg portion; and a pin member mounted on the seat frame and inserted into the elongated hole to connect the seat frame and the leg portion to each other. The elongated hole may at least partially include a narrow portion having a width narrower than a diameter or a width of the pin member.

The elongated hole may include a first end portion and a second end portion, respectively formed at both end portions of the elongated hole in a longitudinal direction, and the narrow portion connecting the first end portion and the second end portion of the elongated hole to each other. The narrow portion may have a constant width in a longitudinal direction of the elongated hole.

The elongated hole may include a first end portion and a second end portion, respectively formed at both end portions of the elongated hole in a longitudinal direction, and the narrow portion connecting the first end portion and the second end portion of the elongated hole to each other. The narrow portion may have a width gradually decreasing from the first end portion to the second end portion thereof.

The elongated hole may include a first end portion and a second end portion, respectively formed at both end portions of the elongated hole in a longitudinal direction, and the narrow portion connecting the first end portion and the second end portion of the elongated hole to each other. The narrow portion may include a plurality of beads protruding from a side wall of the elongated hole to an interior of the elongated hole.

The narrow portion may have a minimum width defined as a distance between an end portion of the bead, protruding from a first side wall of the elongated hole, and a second side wall of the elongated hole, and a maximum width defined as a distance between the one side wall of the elongated hole and the other side wall of the elongated hole. The minimum width may be less than the diameter or the width of the pin member.

The plurality of beads may be alternately disposed on one side wall and the other side wall of the elongated hole.

The bead may have a thickness defined as a length extending along a longitudinal direction of the elongated hole in the bead. The plurality of beads may have a thickness increasing from the first end portion to the second end portion.

The pin member may be mounted at the first end portion in an unloaded state. At least a width of the first end portion may be equal to the diameter or the width of the pin member.

The seat frame may include a pair of side members respectively disposed on left and right sides of the seat, the pair of side members including symmetrical or the same shapes, and at least one support member disposed between the pair of side members to connect the pair of side members to each other. The side member may have at least one through-hole through which the pin member is insertable and passable.

The pin member may be formed as an extension portion extending from an end portion of the support member.

The pin member may be formed as a bolt, and the support member may include a screw hole formed in an end portion thereof in an axial direction so that the pin member may be screwed into the screw hole.

The pin member may be formed as a bolt, and may include a nut fastened to the bolt.

When a plurality of pin members are respectively provided on the side members and are spaced from each other in a height direction of the seat, a plurality of elongated holes may be formed in the leg portion. The plurality of elongated holes may be disposed in series in a longitudinal direction of the leg portion.

The leg portion may further include a foot extending from a lower end portion thereof in forward and backward directions of the seat.

The leg portion may be fixed to a floor within a cabin of a mobility vehicle.

According to example embodiments of the present disclosure, an impact load vertically applied in the event of an accident may be sufficiently absorbed without increasing the number of parts, weight, and costs, ensuring the safety of a passenger.

Furthermore, according to example embodiments of the present disclosure, even when a non-uniform impact load is applied to left and right leg portions of a seat, a variable reaction force may be applied, resulting in almost uniform behavior, minimizing injury to a passenger.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
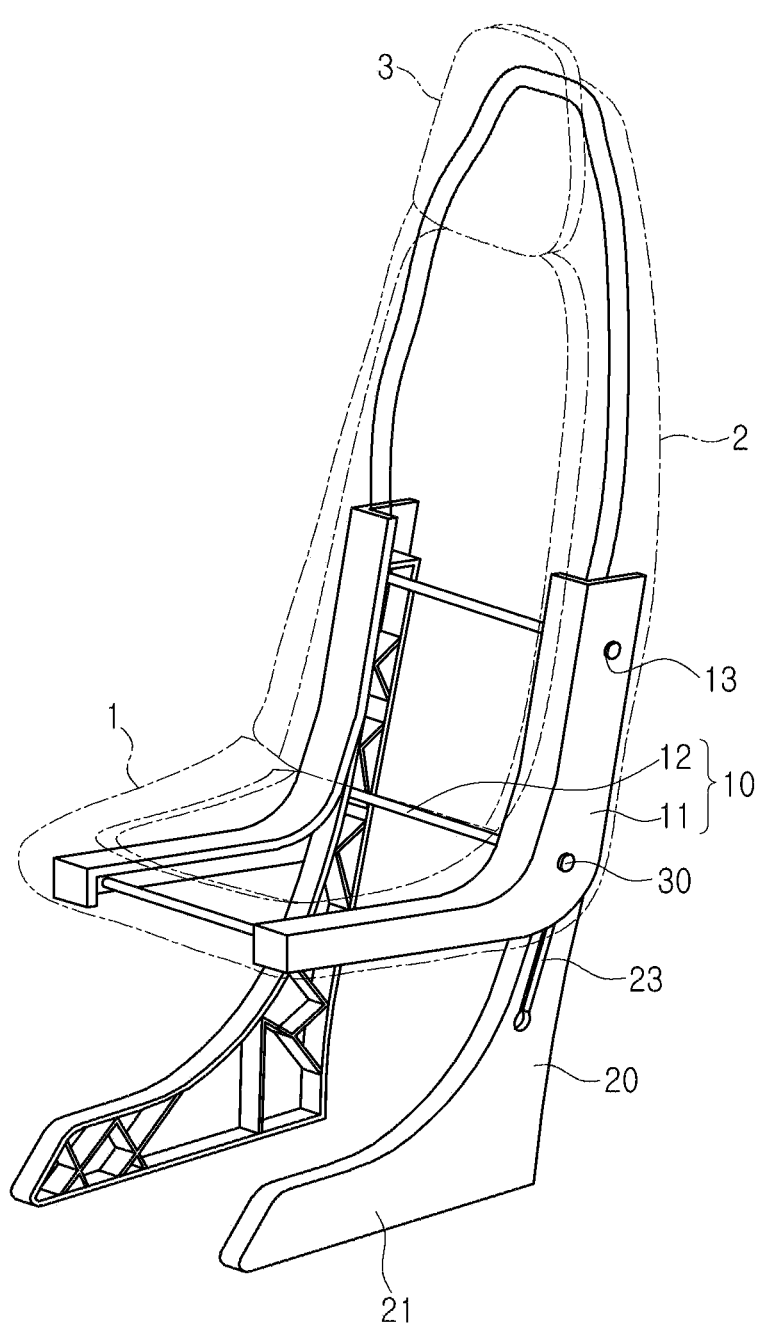
FIG. 1 is a perspective view exemplarily illustrating a seat for a mobility vehicle according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, the present disclosure will be described in detail with reference to exemplary drawings. In adding reference numerals to components of each drawing, it should be noted that the same components are indicated by the same numerals even though displayed on different drawings.

In the present specification, for ease of description, the present disclosure is described using an example in which the present disclosure is applied to an aerial mobility vehicle including a cabin, but the present disclosure is not necessarily limited thereto. For example, the present disclosure may be applied not only to the aerial mobility vehicle, but also to an aquatic or underwater mobility vehicle and a land mobility vehicle provided with a cabin or interior.

Furthermore, terms such as first, second, A, B, (a), (b), and the like may be used herein to describe components. Each of these terminologies is not used to define an essence, sequence, size, or importance of a corresponding component but used merely to distinguish the corresponding component from other component(s).

Figure 2:
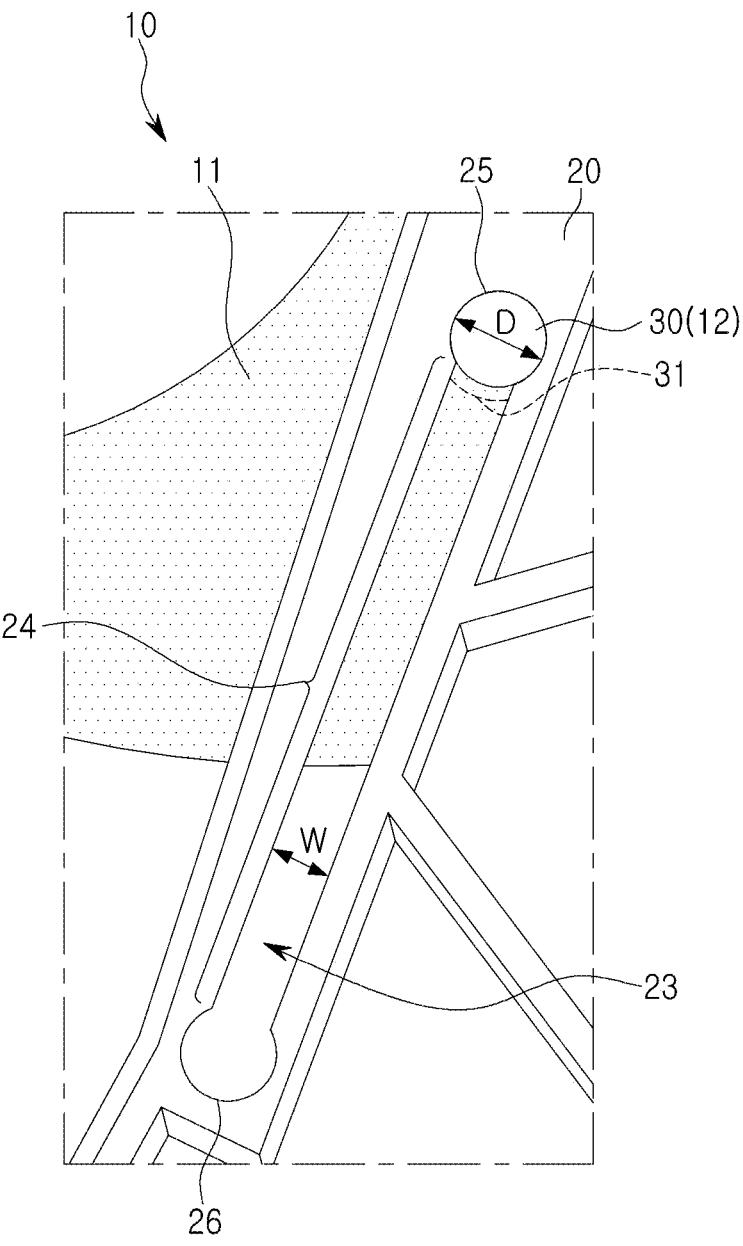
FIG. 2 is a side view exemplarily illustrating a main portion of a seat according to a first exemplary embodiment of the present disclosure.

FIG. 1 is a perspective view exemplarily illustrating a seat for a mobility vehicle according to an exemplary embodiment of the present disclosure. FIG. 2 is a side view exemplarily illustrating a main portion of a seat according to a first exemplary embodiment of the present disclosure.

The seat according to the first exemplary embodiment of the present disclosure may include a seat frame 10, at least one leg portion 20, and a pin member 30.

The seat may include a seat bottom 1 supporting a lower body of a passenger, a seat back 2 on which the passenger reclines his or her upper body, and a head rest 3 supporting a head and a neck of the passenger. Optionally, such components of the seat may be covered with a cover or mesh formed of a material such as cloth, fabric, or plastic.

The seat frame 10 may support at least the seat bottom 1. To the present end, the seat frame 10 may include a pair of side members 11 and at least one support member 12.

The pair of side members 11 may be respectively disposed on left and right sides of the seat, and may have symmetrical or the same shapes. For example, the side member 11 may be formed of a metal or plastic material to have an approximately L-shape, but the shape and material of the side member 11 are not necessarily limited to the above-described examples.

For example, as illustrated in FIG. 1, the side member 11 may have an approximately L-shape so that the pair of side members 11 may support the seat bottom 1 and the seat back 2 together.

At least one support member 12 may be disposed between the side members 11 to connect the side members 11 to each other. The support member 12 may be formed, for example, as a rod-shaped member having a circular cross-section, but the present disclosure is not necessarily limited thereto. FIG. 1 and FIG. 2 illustrate an example in which the support members 12 extend in a width direction of the seat to be disposed between the side members 11 in positions corresponding to front and rear end portions of the seat bottom 1 and an intermediate portion of the seat back 2, respectively.

The side member 11 and the seat frame 10 may be connected to and supported by the leg portion 20 via the pin member 30. To the present end, each side member 11 may have at least one through-hole 13 through which the pin member 30 is insertable and passable.

At least one leg portion 20 may be connected to the seat frame 10 to support the seat frame 10. Furthermore, for example, a lower end portion of the leg portion 20 may be fixed to a floor within a cabin of an aerial mobility vehicle. When a rail is provided on the floor, the lower end portion of the leg portion 20 may vary in position along the rail, and may be fixed on the rail.

The leg portion 20 may be formed as an angled tubular member with one side surface open, but the present disclosure is not necessarily limited thereto. Furthermore, the leg portion 20 formed of a metal material, such as aluminum or a plastic material may be molded, implementing easy shaping.

FIG. 1 and FIG. 2 illustrate an example in which a pair of leg portions 20 are connected to the seat frame 10 on a rear side of the seat bottom 1 and are disposed to extend approximately in a height direction of the seat. The pair of leg portions 20 may be respectively disposed on left and right sides of the seat, and may have symmetrical or the same shapes.

For stable fixation and support, the leg portion 20 may further include a foot 21, extending in forward and backward directions of the seat, at a lower end portion thereof. The foot 21 may be molded integrally with the leg portion 20, but the present disclosure is not necessarily limited thereto. As a result, the leg portion 20 may have an approximately L-shape.

One leg portion 20 may include at least one elongated hole 23 formed to extend in a longitudinal direction of the leg portion 20 (that is, a height direction of the seat) and to pass through the leg portion 20. The elongated hole 23 may at least partially include a narrow portion 24, formed to have a width W less than a diameter D or width of the pin member 30.

In the seat according to the first exemplary embodiment of the present disclosure, the elongated hole 23 may include a first end portion 25 and a second end portion 26 formed at both end portions of the elongated hole 23 in a longitudinal direction, and a narrow portion 24 connecting the first end portion 25 and the second end portion 26 to each other, the narrow portion 24 having a constant width W smaller than a diameter D or width of the pin member 30.

The first end portion 25 and the second end portion 26, positioned at both the end portions, and the narrow portion 24 may communicate with each other to form one elongated hole 23. The first end portion 25 may be positioned at an upper end portion of the elongated hole 23, and the second end portion 26 may be positioned at a lower end portion of the elongated hole 23.

The first end portion 25 is configured as an installation position in which the pin member 30 is mounted in an unloaded state. The second end portion 26 is configured as a stop position in which the movement of the pin member 30, caused by an impact load, is prevented and the pin member is accommodated.

In the elongated hole 23, a width of each end portion 25 or 26 may be wider than the width W of the narrow portion 24. Furthermore, the width of each end portion 25 or 26 may be the equal to the diameter D or width of the pin member 30. The width of the narrow portion 24 may have a constant size in a longitudinal direction of the elongated hole 23. In the seat of the present disclosure, the narrow portion 24 of the elongated hole 23 may form a shock absorbing means.

The pin member 30 may be provided in a state of being inserted into and passing through the through-hole 13 of the side member 11 and the elongated hole 23 of the leg portion 20 to connect the side member 11 of the seat frame 10 and the leg portion 20 to each other. For example, the pin member 30 may be molded or coupled integrally with the support member 12.

For example, the pin member 30 may be formed as an extension portion extending from both end portions of the support member 12.

In the instant case, the support member 12 may be inserted into and pass through the through-holes 13 of both side members 11 and the elongated holes 23 of both leg portions 20, and a nut may be fastened to a thread, formed at an end portion of the support member 12. A washer may be located between an extension portion of the support member 12, that is, the pin member 30, and the through-hole 13 of the side member 11, as necessary. In an unloaded state, the extension portion of the support member 12, that is, the pin member 30, may be positioned at the first end portion 25, positioned at the upper end portion of the elongated hole 23.

For example, when a plurality of support members 12, connecting the pair of side members 11 to each other, are spaced from each other in a height direction of the seat, a plurality of elongated holes 23 may be formed in positions of the leg portion 20 corresponding to the support members 12, respectively. The plurality of elongated holes 23 may be disposed in series in a longitudinal direction of the leg portion 20.

Optionally, the pin member 30 may be formed as a bolt, and the support member 12 may include a screw hole formed in an end portion thereof in an axial direction so that the pin member 30, that is, the bolt, may be screwed into the screw hole to be integrally coupled to the support member.

In the instant case, the pin member 30 may be inserted into and pass through a through-hole 13 of one side member 11 and an elongated hole 23 of one leg portion 20, and may then be screwed into a screw hole formed in one end portion of the support member 12. A washer may be located between the pin member 30 and the through-hole 13 of the side member 11, as necessary. In an unloaded state, the pin member 30 may be positioned at the first end portion 25, positioned at the upper end portion of the elongated hole 23.

For example, when a plurality of support members 12, connecting the pair of side members 11 to each other, are spaced from each other in a height direction of the seat, a plurality of elongated holes 23 may be formed in positions of the leg portion 20 corresponding to the support members 12, respectively. The plurality of elongated holes 23 may be disposed in series in a longitudinal direction of the leg portion 20.

Alternatively, the pin member 30 may be formed as a bolt, and may include a nut 31 fastened to the bolt. In the instant case, the pin member 30 may not be positioned to correspond to the support member 12 or may not be coupled to the support member 12. The pin member 30 may be inserted into and pass through a through-hole 13 of one side member 11 and an elongated hole 23 of one leg portion 20, and then the nut 31 may be fastened to an end portion of the pin member 30. A washer may be located between the pin member 30 and the through-hole 13 of the side member 11, as necessary. In an unloaded state, the pin member 30 may be positioned at the first end portion 25, positioned at the upper end portion of the elongated hole 23.

For example, when a plurality of pin members 30, included in each side member 11, are spaced from each other in a height direction of the seat, a plurality of elongated holes 23 may be formed in positions of the leg portion 20 corresponding to the pin members 30, respectively. The plurality of elongated holes 23 may be disposed in series in a longitudinal direction of the leg portion 20.

In the seat according to the first exemplary embodiment of the present disclosure configured as described above, in an unloaded state, the pin member 30 may be inserted into and pass through the first end portion 25 of the elongated hole 23, and may pass through even the through-hole 13 of the side member 11 aligned with the elongated hole 23. As a result, the pin member 30 may be fixedly provided.

Accordingly, in the seat according to the first exemplary embodiment of the present disclosure, a passenger may sit on the seat bottom 1, and a load may be transmitted from the side member 11 of the seat frame 10 to the leg portion 20 and the foot 21 through the pin member 30, and may then be transmitted to the floor.

Figure 3:
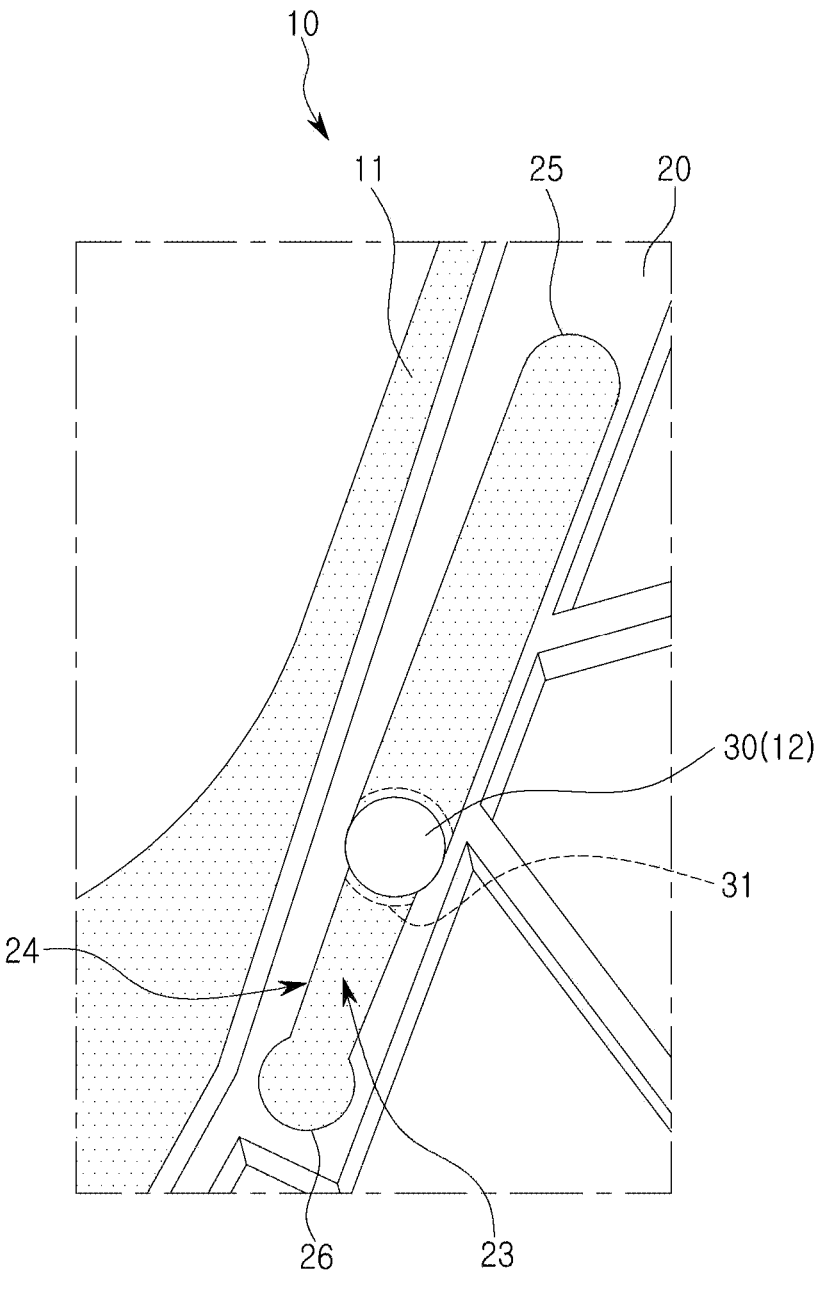
FIG. 3 is a side view exemplarily illustrating a state in which a main portion of a seat according to a first exemplary embodiment of the present disclosure is deformed after an impact load is absorbed.

FIG. 3 is a side view exemplarily illustrating a state in which a main portion of a seat according to a first exemplary embodiment of the present disclosure is deformed after an impact load is absorbed.

When an impact load is applied downward to the seat, the pin member 30 may move from the first end portion 25 according to the guidance of the elongated hole 23. As a result, a reaction force of the elongated hole 23, generated in a longitudinal direction of the elongated hole and the leg portion 20 when the narrow portion 24 of the elongated hole 23 expands and deforms, may attenuate the impact load. Here, the reaction force may be changed depending on a material of the leg portion 20 or a width W of the narrow portion 24 of the elongated hole 23.

The movement of the pin member 30 may be prevented in an intermediate portion or lower portion of the narrow portion 24, but the present disclosure is not necessarily limited thereto. When the pin member 30 reaches the second end portion 26 positioned at the lower end portion of the elongated hole 23, the movement of the pin member 30 may be terminated, and the pin member 30 may be accommodated at the second end portion 26.

As illustrated in FIG. 3, the seat according to the first exemplary embodiment of the present disclosure may absorb an impact load due to the expansion of the elongated hole 23 of the leg portion 20, particularly the expansion of the narrow portion 24, caused by the movement of the pin member 30. Thereafter, a cross-sectional shape of the leg portion 20 in an expansion direction of the elongated hole 23 may expand and deform.

Accordingly, mechanical energy, generated by an impact load applied to the seat, may be dissipated due to the expansion of a cross-section of the leg portion 20 in addition to the expansion of the narrow portion 24, caused by the pin member 30, in the elongated hole 23 of the leg portion 20.

Accordingly, the seat according to the first exemplary embodiment of the present disclosure may include the leg portion 20 including a shock absorbing means having a simple configuration, that is, including the elongated hole 23 and the narrow portion 24, sufficiently absorbing an impact load vertically applied in the event of an accident without increasing the number of parts, weight, and cost.

Figure 4:
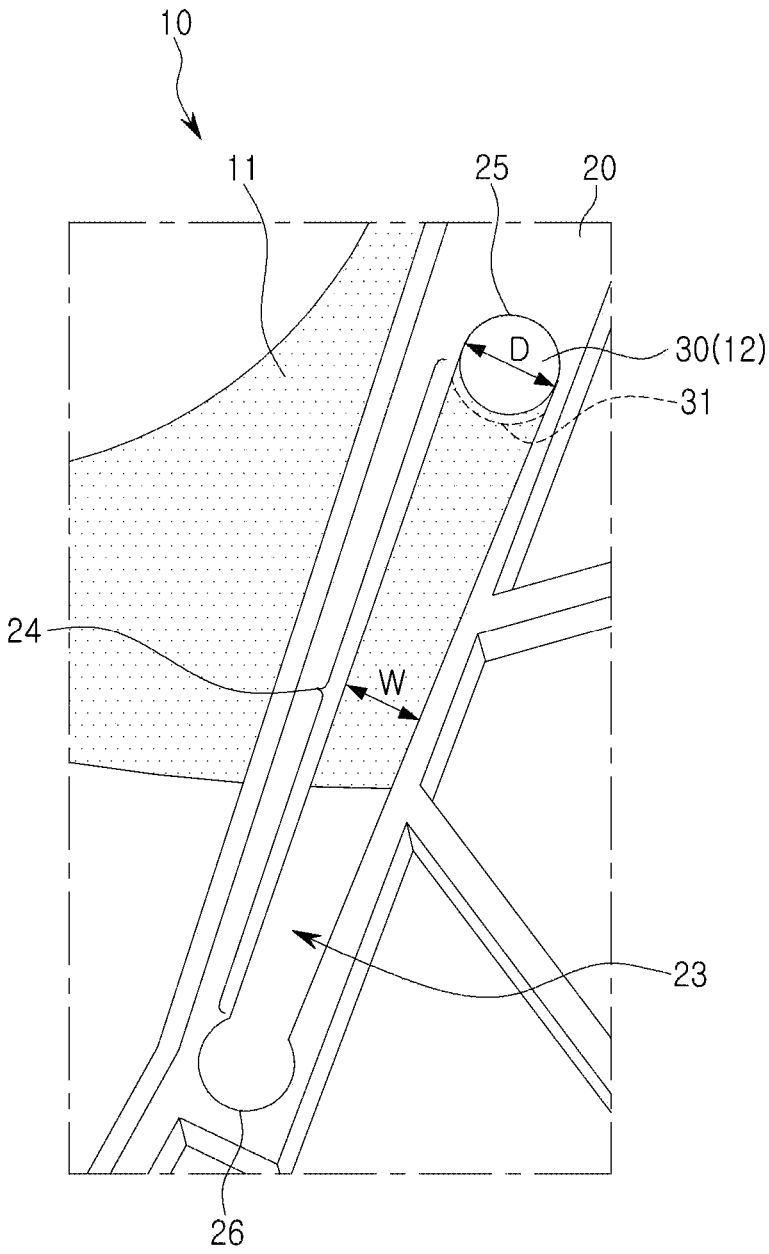
FIG. 4 is a side view exemplarily illustrating a main portion of a seat according to a second exemplary embodiment of the present disclosure.

FIG. 4 is a side view exemplarily illustrating a main portion of a seat according to a second exemplary embodiment of the present disclosure.

The seat according to the second exemplary embodiment of the present disclosure may include a seat frame 10, at least one leg portion 20, and a pin member 30.

The second exemplary embodiment illustrated in FIG. 4 may be different from the first exemplary embodiment in terms of a shape of an elongated hole 23 formed in the leg portion 20, and may be the same as the first exemplary embodiment in terms of remaining components. Accordingly, in describing the seat according to the second example embodiment, components the same as those of the above-described seat according to the first exemplary embodiment will be denoted by the same reference numerals and detailed descriptions of configuration and functions of the components will be omitted.

In the seat according to the second exemplary embodiment of the present disclosure, the elongated hole 23 may include a first end portion 25 and a second end portion 26 formed at both end portions of the elongated hole 23 in a longitudinal direction, and a narrow portion 24 connecting the first end portion 25 and the second end portion 26 to each other, the narrow portion 24 having a width W which is less than a diameter D or width of the pin member 30 and gradually decreases from the first end portion 25 to the second end portion 26.

The first end portion 25 and the second end portion 26, positioned at both the end portions, and the narrow portion 24 may communicate with each other to form one elongated hole 23. The first end portion 25 may be positioned at an upper end portion of the elongated hole 23, and the second end portion 26 may be positioned at a lower end portion of the elongated hole 23.

The first end portion 25 is configured as an installation position in which the pin member 30 is mounted in an unloaded state. The second end portion 26 is configured as a stop position in which the movement of the pin member 30, caused by an impact load, is prevented and the pin member is accommodated.

In the elongated hole 23, a width of each end portion 25 or 26 may be wider than the width W of the narrow portion 24. Furthermore, the width of each end portion 25 or 26 may be the equal to the diameter D or width of the pin member 30. The width of the narrow portion 24 may have a size gradually decreasing along a longitudinal direction of the elongated hole 23. Accordingly, the narrow portion 24 may have a tapered shape from the first end portion 25 to the second end portion 26.

The pin member 30 may be provided in a state of being inserted into and passing through the through-hole 13 of the side member 11 and the elongated hole 23 of the leg portion 20 to connect the side member 11 of the seat frame 10 and the leg portion 20 to each other. For example, the pin member 30 may be molded or coupled integrally with the support member 12.

Alternatively, the pin member 30 may be formed as a bolt, and may include a nut 31 fastened to the bolt. In the instant case, the pin member 30 may not be positioned to correspond to the support member 12 or may not be coupled to the support member 12.

In the seat according to the second exemplary embodiment of the present disclosure configured as described above, in an unloaded state, the pin member 30 may be inserted into and pass through the first end portion 25 of the elongated hole 23, and may pass through even the through-hole 13 of the side member 11 aligned with the elongated hole 23. As a result, the pin member 30 may be fixedly provided.

Figure 5:
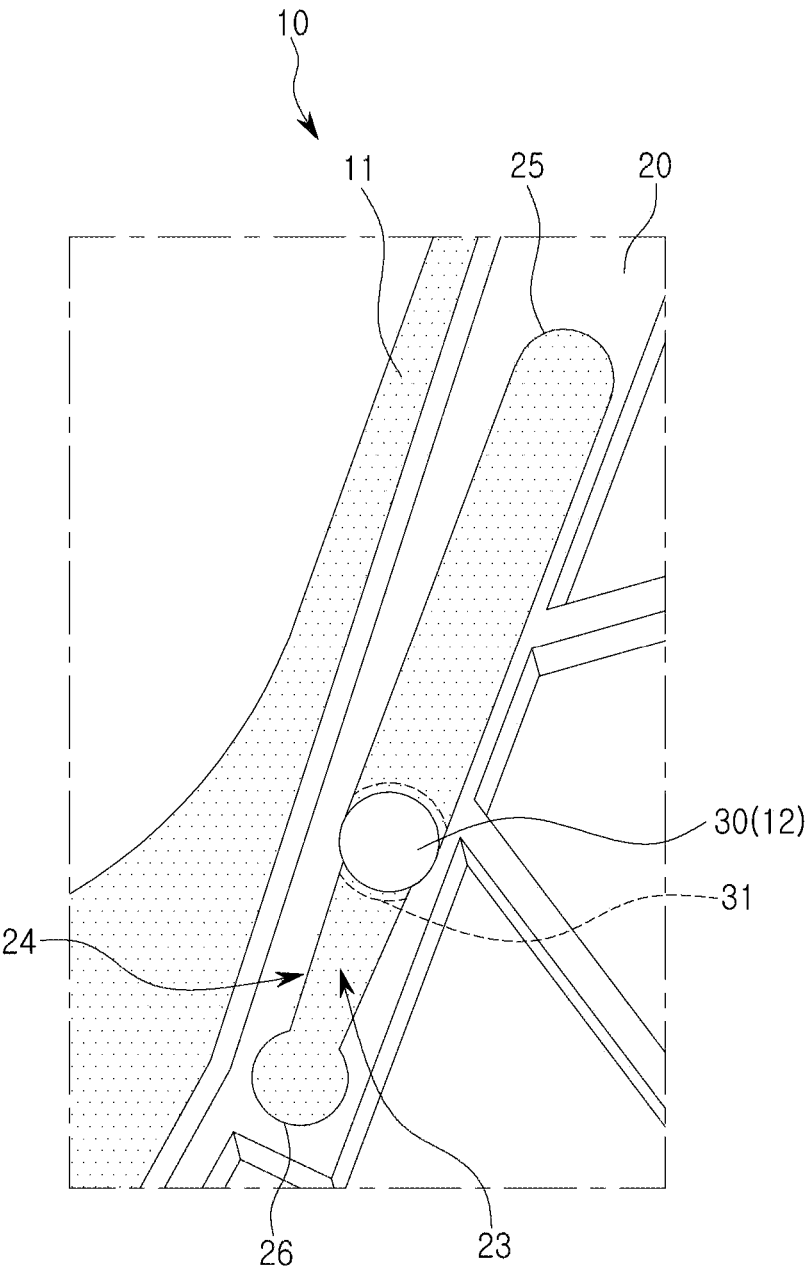
FIG. 5 is a side view exemplarily illustrating a state in which a main portion of a seat according to a second exemplary embodiment of the present disclosure is deformed after an impact load is absorbed.

FIG. 5 is a side view exemplarily illustrating a state in which a main portion of a seat according to a second exemplary embodiment of the present disclosure is deformed after an impact load is absorbed.

When an impact load is applied downward to the seat, the pin member 30 may move from the first end portion 25 according to the guidance of the elongated hole 23. As a result, a reaction force of the elongated hole 23, generated in a longitudinal direction of the elongated hole and the leg portion 20 when the narrow portion 24 of the elongated hole 23 expands and deforms, may attenuate the impact load. Here, the width W of the elongated hole 23 may decrease toward the second end portion 26 so that a progressively larger reaction force may be generated as a distance between the pin member 30 and the second end portion 26 decreases.

The movement of the pin member 30 may be prevented in an intermediate portion or lower portion of the narrow portion 24, but the present disclosure is not necessarily limited thereto. When the pin member 30 reaches the second end portion 26 positioned at the lower end portion of the elongated hole 23, the movement of the pin member 30 may be terminated, and the pin member 30 may be accommodated at the second end portion 26.

As illustrated in FIG. 5, the seat according to the second exemplary embodiment of the present disclosure may absorb an impact load due to the expansion of the elongated hole 23 of the leg portion 20, particularly expansion of the narrow portion 24, caused by the movement of the pin member 30. Thereafter, a cross-sectional shape of the leg portion 20 in an expansion direction of the elongated hole 23 may expand and deform.

Accordingly, mechanical energy, generated by an impact load applied to the seat, may be dissipated due to the expansion of a cross-section of the leg portion 20 in addition to the expansion of the narrow portion 24, caused by the pin member 30, in the elongated hole 23 of the leg portion 20.

Accordingly, the seat according to the second exemplary embodiment of the present disclosure may include the leg portion 20 including a shock absorbing means having a simple configuration, that is, having the elongated hole 23 and the narrow portion 24, sufficiently absorbing an impact load vertically applied in the event of an accident without increasing the number of parts, weight, and cost.

Figure 6:
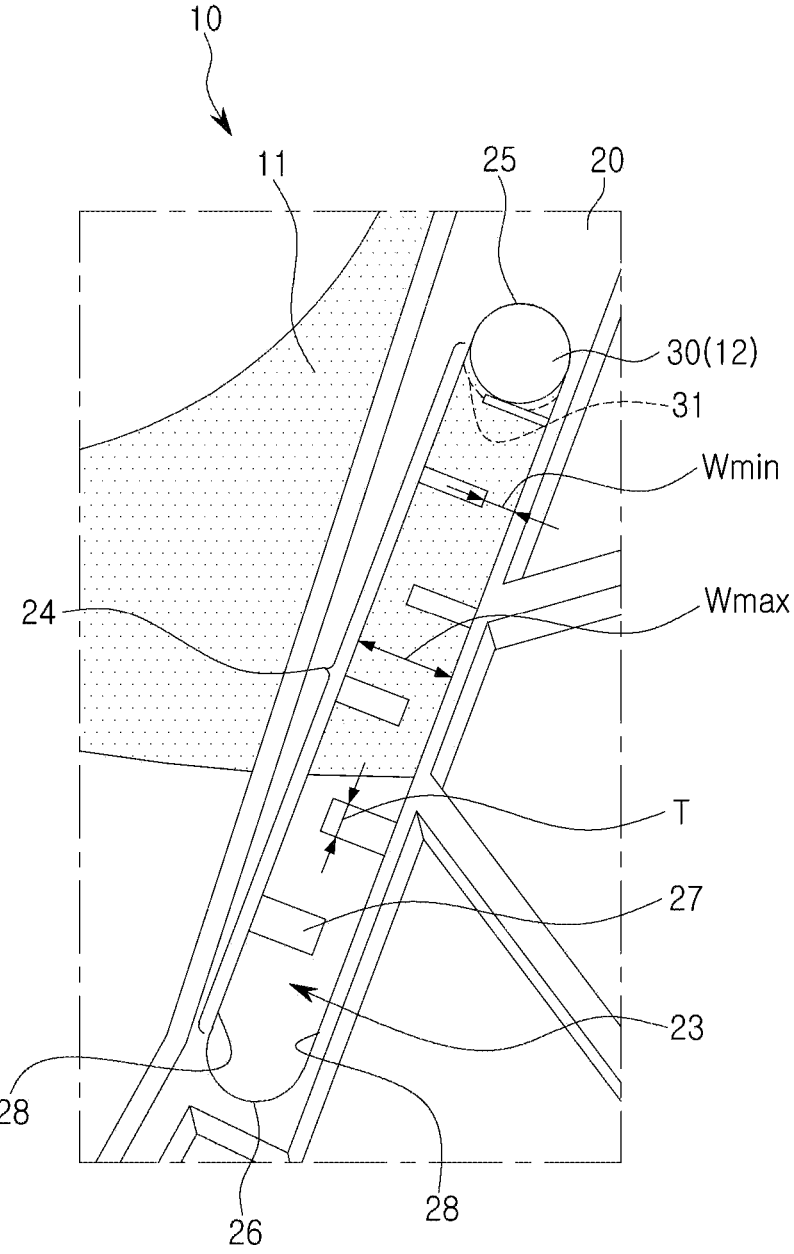
FIG. 6 is a side view exemplarily illustrating a main portion of a seat according to a third exemplary embodiment of the present disclosure.

FIG. 6 is a side view exemplarily illustrating a main portion of a seat according to a third exemplary embodiment of the present disclosure.

The seat according to the third exemplary embodiment of the present disclosure may include a seat frame 10, at least one leg portion 20, and a pin member 30.

The third exemplary embodiment illustrated in FIG. 6 may be different from the first exemplary embodiment in terms of a shape of an elongated hole 23, formed in the leg portion 20, and the addition of a bead 27, and may be the same as the first exemplary embodiment in terms of remaining components. Accordingly, in describing the seat according to the third example embodiment, components the same as those of the above-described seat according to the first exemplary embodiment will be denoted by the same reference numerals and detailed descriptions of configuration and functions of the components will be omitted.

In the seat according to the third exemplary embodiment of the present disclosure, the elongated hole 23 may include a first end portion 25 and a second end portion 26 formed at both end portions of the elongated hole 23 in a longitudinal direction, and a narrow portion 24 connecting the first end portion 25 and the second end portion 26 to each other, the narrow portion 24 including a plurality of beads 27 protruding from a side wall 27 to an interior of the elongated hole 23.

The first end portion 25 and the second end portion 26, positioned at both the end portions, and the narrow portion 24 may communicate with each other to form one elongated hole 23. The first end portion 25 may be positioned at an upper end portion of the elongated hole 23, and the second end portion 26 may be positioned at a lower end portion of the elongated hole 23.

The first end portion 25 is configured as an installation position in which the pin member 30 is mounted in an unloaded state. The second end portion 26 is configured as a stop position in which the movement of the pin member 30, caused by an impact load, is prevented and the pin member is accommodated. The width of each end portion may be the equal to the diameter D or width of the pin member 30.

In the seat according to the third exemplary embodiment of the present disclosure, the narrow portion 24 of the elongated hole 23 may have a minimum width Wmin defined as a distance between an end portion of the bead 27, protruding from one side wall 28 of the elongated hole 23, and the other side wall 28 of the elongated hole 23; and a maximum width Wmax defined as a distance between the one side wall 28 and the other side wall 28 of the elongated hole 23. Here, the minimum width Wmin of the narrow portion 24 may be less than a diameter D or width of the pin member 30. Accordingly, the narrow portion 24 may be formed by alternating a maximum-width region and a minimum-width region and connecting the maximum-width region and the minimum-width region to each other.

The plurality of beads 27 may be alternately disposed on the one side wall 28 and the other side wall 28 of the elongated hole 23, but the present disclosure is not necessarily limited thereto. Furthermore, a thickness T (a length extending in a longitudinal direction of the elongated hole 23) of the bead 27 may have a size gradually increasing in the longitudinal direction of the elongated hole 23. Accordingly, the plurality of beads 27 may have a thickness increasing from the first end portion 25 to the second end portion 26. However, the thickness of the bead 27 is not necessarily limited to the above-described example. For example, the plurality of beads 27 may have the same thickness.

The pin member 30 may be provided in a state of being inserted into and passing through the through-hole 13 of the side member 11 and the elongated hole 23 of the leg portion 20 to connect the side member 11 of the seat frame 10 and the leg portion 20 to each other. For example, the pin member 30 may be molded or coupled integrally with the support member 12.

Alternatively, the pin member 30 may be formed as a bolt, and may include a nut 31 fastened to the bolt. In the instant case, the pin member 30 may not be positioned to correspond to the support member 12 or may not be coupled to the support member 12.

In the seat according to the third exemplary embodiment of the present disclosure configured as described above, in an unloaded state, the pin member 30 may be inserted into and pass through the first end portion 25 of the elongated hole 23, and may pass through even the through-hole 13 of the side member 11 aligned with the elongated hole 23. As a result, the pin member 30 may be fixedly provided.

Figure 7:
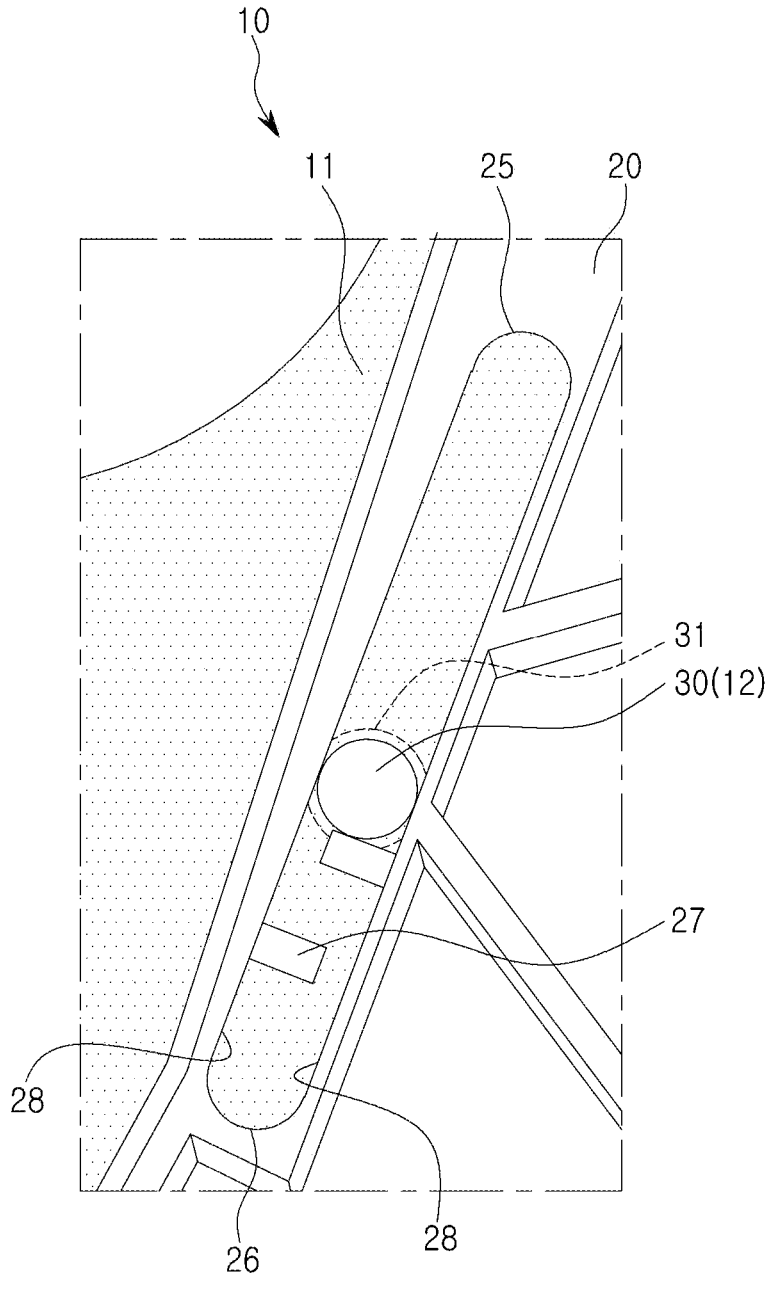
FIG. 7 is a side view exemplarily illustrating a state in which a main portion of a seat according to a third exemplary embodiment of the present disclosure is deformed after an impact load is absorbed.

FIG. 7 is a side view exemplarily illustrating a state in which a main portion of a seat according to a third exemplary embodiment of the present disclosure is deformed after an impact load is absorbed.

When an impact load is applied downward to the seat, the pin member 30 may move from the first end portion 25 according to the guidance of the elongated hole 23. As a result, a reaction force of the elongated hole 23, generated in a longitudinal direction of the elongated hole and the leg portion 20 as the bead 27 of the elongated hole 23 is bent and broken, may attenuate the impact load. Here, the thickness T of the bead 27 may increase toward the second end portion 26 so that a progressively larger reaction force may be generated as a distance between the pin member 30 and the second end portion 26 decreases.

The movement of the pin member 30 may be prevented in an intermediate portion or lower portion of the narrow portion 24, but the present disclosure is not necessarily limited thereto. When the pin member 30 reaches the second end portion 26 positioned at the lower end portion of the elongated hole 23, the movement of the pin member 30 may be terminated, and the pin member 30 may be accommodated at the second end portion 26.

As illustrated in FIG. 7, in the seat according to the third exemplary embodiment of the present disclosure, mechanical energy, generated by an impact load applied to the seat, may be dissipated due to the breaking action of the bead 27, caused by the movement of the pin member 30, in the elongated hole 23 of the leg portion 20.

Accordingly, the seat according to the third exemplary embodiment of the present disclosure may include the leg portion 20 including a shock absorbing means having a simple configuration, that is, including the elongated hole 23, the narrow portion 24, and the bead 27, sufficiently absorbing an impact load vertically applied in the event of an accident without increasing the number of parts, weight, and cost.

Figure 8:
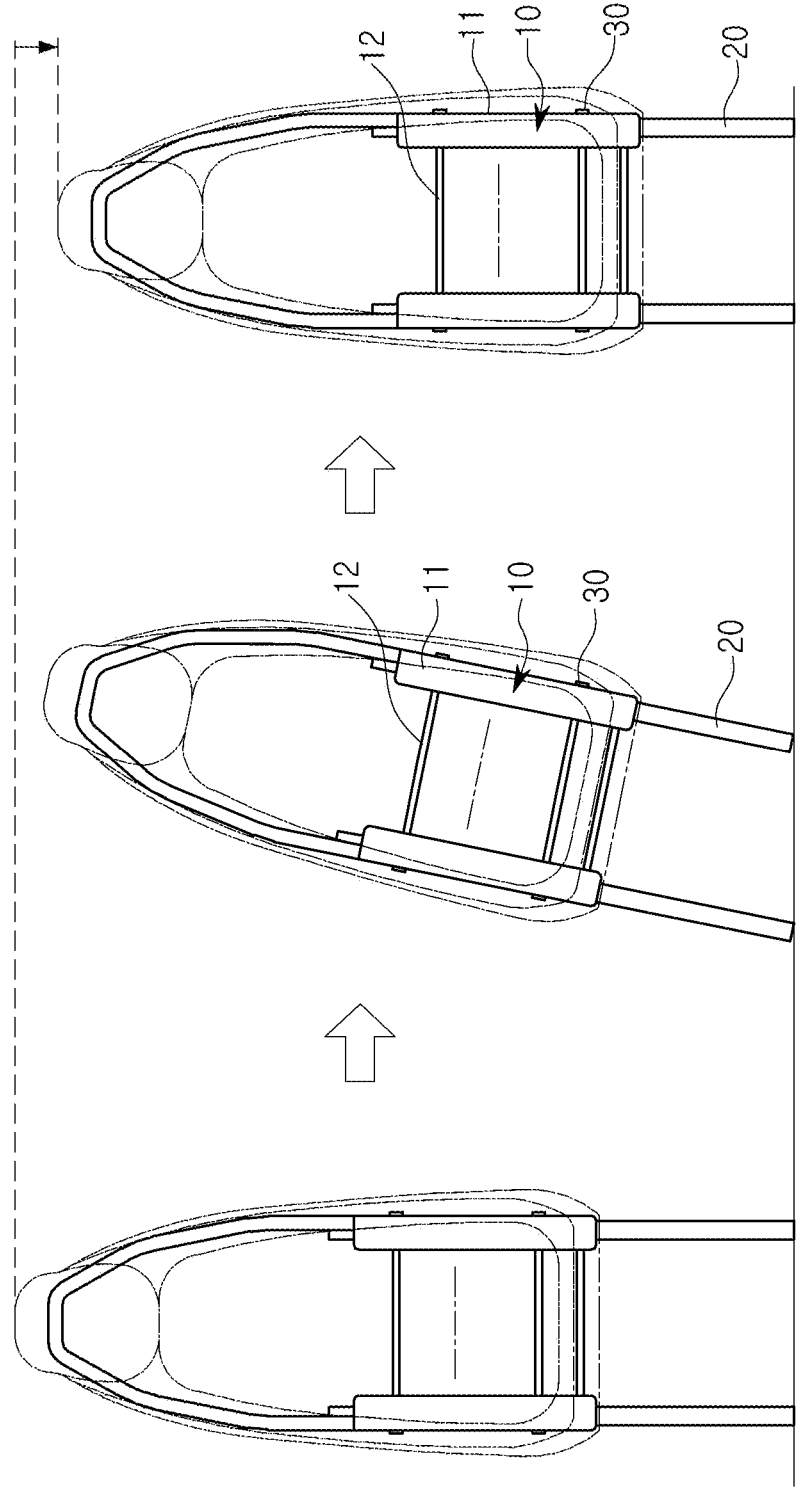
FIG. 8 is a diagram illustrating behavior when a non-uniform impact load is applied to a seat according to a second exemplary embodiment and a third exemplary embodiment of the present disclosure.

FIG. 8 is a diagram illustrating behavior when a non-uniform impact load is applied to a seat according to a second exemplary embodiment and a third exemplary embodiment of the present disclosure.

As described above, in the seat according to the second exemplary embodiment of the present disclosure, the width W of the narrow portion 24 of the elongated hole 23 may be formed to decrease toward the second end portion 26 positioned at the lower end portion of the elongated hole 23. In the seat according to the third exemplary embodiment of the present disclosure, the thickness T of the bead 27 in the elongated hole may be formed to increase toward the second end portion 26. For the present reason, a gradually larger reaction force may be generated as a distance between the pin member 30 and the second end portion 26 decreases.

In the case of the seats, when a larger impact load is applied to one of left and right sides of a seat, a narrow portion 24 or a bead 27 of an elongated hole 23 of one leg portion 20 to which the larger impact load is applied may be deformed to a certain level. However, deformation or breakage may be stopped due to an even larger reaction force. A narrow portion 24 or bead 27 of an elongated hole 23 of the other leg portion 20, having a relatively small reaction force, may be deformed to a certain level.

As a result, an amount of deformation occurring in an elongated hole 23 of one leg portion 20, among left and right leg portions 20 of the seat, may be at a level approximately the same as or similar to that of an amount of deformation occurring in an elongated hole 23 of the other leg portion 20.

Accordingly, in the seats according to the second and third example embodiments of the present disclosure, not only an impact load may be more stably absorbed, but also a variable reaction force may be applied, resulting in almost uniform behavior, distributing the impact load.

As described above, according to example embodiments of the present disclosure, an impact load vertically applied in the event of an accident may be sufficiently absorbed without increasing the number of parts, weight, and cost, ensuring the safety of a passenger.

Furthermore, according to example embodiments of the present disclosure, even when a non-uniform impact load is applied to left and right leg portions of a seat, a variable reaction force may be applied, resulting in almost uniform behavior, minimizing injury to a passenger.

While example embodiments have been illustrated and described above, it will be apparent to those skilled in the art that modifications and variations could be made without departing from the scope of the present disclosure as defined by the appended claims.

For example, the above-described and illustrated example embodiments of the present disclosure may be combined with each other, and various exemplary embodiments of the present disclosure may optionally further employ or replace some components of other example embodiments, as necessary.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A seat apparatus comprising:
  a seat frame supporting at least a seat bottom of the seat apparatus;
  at least one leg portion supporting the seat frame and including an elongated hole formed to extend in a longitudinal direction of the at least one leg portion; and
  a pin member mounted on the seat frame and inserted into the elongated hole to connect the seat frame and the at least one leg portion to each other,
  wherein the elongated hole at least partially includes a narrow portion having a width narrower than a diameter or a width of the pin member,
  wherein the seat frame includes:
    a pair of side members respectively disposed on left and right sides of the seat apparatus, the pair of side members having symmetrical or same shapes; and
    at least one support member disposed between the pair of side members to connect the pair of side members to each other,
    wherein each side member has at least one through-hole through which the pin member is insertable and passable.

2. The seat apparatus of claim 1, wherein the elongated hole includes:
  a first end portion and a second end portion, respectively formed at first and second ends of the elongated hole in the longitudinal direction of the at least one leg portion; and
  the narrow portion connecting the first end portion and the second end portion of the elongated hole to each other,
  wherein the narrow portion includes a constant width in a longitudinal direction of the elongated hole.

3. The seat apparatus of claim 2,
  wherein the pin member is mounted at the first end portion in an unloaded state, and
  a width of the first end portion is equal to the diameter or the width of the pin member.

4. The seat apparatus of claim 1, wherein the elongated hole includes:
  a first end portion and a second end portion, respectively formed at first and second ends of the elongated hole in the longitudinal direction of the at least one leg portion; and
  the narrow portion connecting the first end portion and the second end portion of the elongated hole to each other,
  wherein the narrow portion has the width decreasing from the first end portion to the second end portion.

5. The seat apparatus of claim 1, wherein the elongated hole includes:
  a first end portion and a second end portion, respectively formed at first and second ends of the elongated hole in the longitudinal direction of the at least one leg portion; and
  the narrow portion connecting the first end portion and the second end portion of the elongated hole to each other,
  wherein the narrow portion includes a bead protruding from a side wall of the elongated hole to an interior of the elongated hole.

6. The seat apparatus of claim 5, wherein the bead is in plural and the plurality of beads protrude from the side wall of the elongated hole to the interior of the elongated hole.

7. The seat apparatus of claim 6,
  wherein the narrow portion has a minimum width defined as a distance between an end portion of each bead, protruding from a first side wall of the elongated hole, and a second side wall of the elongated hole, and a maximum width defined as a distance between the first side wall of the elongated hole and the second side wall of the elongated hole, and
  wherein the minimum width is less than the diameter or the width of the pin member.

8. The seat apparatus of claim 6, wherein the plurality of beads are alternately disposed on a first side wall and a second side wall of the elongated hole.

9. The seat apparatus of claim 8,
  wherein each bead has a thickness defined as a length extending along a longitudinal direction of the elongated hole in each bead, and
  wherein the plurality of beads have a thickness increasing from the first end portion to the second end portion.

10. The seat apparatus of claim 6,
  wherein each bead has a thickness defined as a length extending along a longitudinal direction of the elongated hole in the bead, and
  wherein the plurality of beads have a thickness increasing from the first end portion to the second end portion.

11. The seat apparatus of claim 5,
  wherein the narrow portion has a minimum width defined as a distance between an end portion of the bead, protruding from a first side wall of the elongated hole, and a second side wall of the elongated hole, and a maximum width defined as a distance between the first side wall of the elongated hole and the second side wall of the elongated hole, and
  wherein the minimum width is less than the diameter or the width of the pin member.

12. The seat apparatus of claim 1, wherein the pin member is formed as an extension portion extending from an end portion of the at least one support member.

13. The seat apparatus of claim 1, wherein the pin member is formed as a bolt, and the at least one support member includes a screw hole formed in an end portion thereof in an axial direction so that the pin member is screwed into the screw hole.

14. The seat apparatus of claim 1, wherein the pin member is formed as a bolt, and includes a nut fastened to the bolt.

15. The seat apparatus of claim 1,
  wherein the pin member is in plural and the elongated hole is in plural, and
  wherein the plurality of pin members are respectively provided on the side members and are spaced from each other in a height direction of the seat apparatus and the plurality of elongated holes are formed in the at least one leg portion, and wherein the plurality of elongated holes are disposed in series in the longitudinal direction of the at least one leg portion.

16. The seat apparatus of claim 1, wherein the at least one leg portion further includes a foot extending from a lower end portion of the at least one leg portion.

17. The seat apparatus of claim 1, wherein the at least one leg portion is fixed to a floor within a cabin of a mobility vehicle.

\* \* \* \* \*